(12) United States Patent
Lindmark et al.

(10) Patent No.: US 7,849,559 B2
(45) Date of Patent: Dec. 14, 2010

(54) PEDESTRIAN SAFETY HOOD STOP

(75) Inventors: Peter Lindmark, Hisings Backa (SE); Christer Bjornrud, Kungalv (SE)

(73) Assignee: Volvo Car Corporation, Gothenburg (SE)

(*) Notice: Subject to any disclaimer, the term of this patent is extended or adjusted under 35 U.S.C. 154(b) by 5 days.

(21) Appl. No.: 12/428,630

(22) Filed: Apr. 23, 2009

(65) Prior Publication Data
US 2009/0278383 A1 Nov. 12, 2009

(30) Foreign Application Priority Data
May 7, 2008 (EP) .................................. 08155782

(51) Int. Cl.
*B62D 25/12* (2006.01)
*B60R 21/34* (2006.01)

(52) U.S. Cl. ............. 16/86 A; 296/187.04; 296/193.11; 180/69.2; 180/274; 188/377

(58) Field of Classification Search ............ 296/187.04, 296/193.11, 146.7; 180/69.2, 69.21, 274; 16/86 R, 86 A; 188/376, 377; 293/135
See application file for complete search history.

(56) References Cited

U.S. PATENT DOCUMENTS
5,531,499 A * 7/1996 Vecchio et al. ........... 296/146.7

FOREIGN PATENT DOCUMENTS
| EP | 1277630 A | 1/2003 |
| EP | 1398249 A | 3/2004 |
| EP | 1488987 A | 12/2004 |
| EP | 1595755 A | 11/2005 |
| FR | 2874876 A | 3/2006 |

OTHER PUBLICATIONS

European Patent Office, European Search Report for the corresponding EP Patent Application No. 08 15 5782 mailed Oct. 14, 2008.

* cited by examiner

*Primary Examiner*—Dennis H Pedder
(74) *Attorney, Agent, or Firm*—Brooks Kushman P.C.

(57) ABSTRACT

A vehicle hood stop arranged to collapse if the vehicle hood is struck by an object with an impact force exceeding a predetermined limit. The hood stop includes an upper section arranged below a lower surface of the hood, a lower section arranged to be attached to the vehicle, and at least one impact absorbing sections, where a first impact absorbing sections includes at least three collapsible supporting members arranged to diverge from one another as they extend from the upper section toward the lower section.

12 Claims, 7 Drawing Sheets

PEDESTRIAN SAFETY HOOD STOP

CROSS-REFERENCE TO RELATED APPLICATIONS

This application claims foreign priority benefits under 35 U.S.C. §119(a)-(d) to EP 08155782.9 filed May 7, 2008, which is hereby incorporated by reference in its entirety.

BACKGROUND

1. Technical Field

The present invention relates to a safety-enhancing hood stop for a vehicle, which hood stop is arranged to collapse in order to absorb impact energy if the hood is struck by an object such as a pedestrian or cyclist.

2. Background Art

In the event of a collision between a pedestrian or a cyclist and a motor vehicle it is desirable to minimize the extent of injuries incurred, in particular in the chest and head area of the person. It is generally well-known to provide a relatively large minimum distance between a front hood and a rigid sub-structure of the vehicle (vehicle body or frame, various power train components, suspension strut mountings, etc.) so that a sufficient deformation distance is available for the front hood, in order to retard the impact of the pedestrian or cyclist in a biomechanically compatible manner.

With some vehicles the desired minimum distance between a closed front hood and the rigid sub-structure is not available for reasons of packaging, that is, the design of the body, engine, and the hood leaves less than the desired distance between the two components. In such cases, the front hood can be actively raised to achieve the desired deformation distance when a collision between the vehicle and a pedestrian or cyclist is detected or predicted. However, such systems are relatively complex and require accurate detection or prediction of an impending collision to ensure correct activation of the system.

In addition to providing impact protection, hood stop buffers are frequently arranged at the front of the hood to define a closing position of the hood.

EP 1,488,987 A1 shows an example of a hood stop for a front hood, which functions as a conventional stop buffer up to a predefined load. When subjected to a load above the predefined maximum load, as in the case of the impact of a pedestrian or a cyclist on the front hood, the hood stop will undergo plastic deformation in the vertical direction as a supporting first member breaks. The hood stop comprises a deformable second member that absorbs energy during plastic deformation, in order to retard the impact of the pedestrian or cyclist in biomechanically compatible way. A problem with this arrangement is that once the first member has broken or sheared, the hood stop will continue to deform under a relatively low load over the remaining deformation distance. There is no way of controlling the rate at which the second member is deformed once the load on the first member has exceeded the maximum load. Under a relatively high load, the impact may not be completely absorbed before the hood reaches the underlying structure.

SUMMARY

The above problems are solved by a hood stop as disclosed herein. One object of the invention is it to provide an improved pedestrian protection hood stop for a front hood, allowing the rate at which the hood stop deforms and absorbs energy to be tailored as required for many safety applications.

A further object is to provide a hood stop that can be adapted for use in different vehicles by allowing the deformation properties to be modified.

In the subsequent text, terms such as front, rear, inner and outer are defined in relation to a central longitudinal axis of the vehicle, in its main direction of movement.

According to a first embodiment, a vehicle hood stop is arranged to collapse if the vehicle hood is struck by an object with an impact force exceeding a predetermined limit. The hood stop is provided with an upper section disposed below a lower surface of the hood and a lower section adapted to be attached to the vehicle. The hood stop is further provided with at least one impact absorbing section comprising at least three collapsible supporting members arranged to diverge from one another as they extend from the upper section toward the lower section.

Each supporting member may comprise a weakened section with a progressively reduced cross-sectional area. At least one supporting member may be provided with a different reduced cross-sectional area, in order to control the direction of collapse of the hood stop. For instance, if one supporting member is provided with a smaller cross-sectional area, then a sufficiently large downward force on the hood stop will cause this weaker supporting member will deform and/or fracture (yield) before the remaining supporting members. In this way the hood stop can be made to collapse in a predetermined direction, for instance, towards a location where there is sufficient space to avoid interference between the collapsed hood stop and the displaced hood.

The reduced cross-sectional area of each weakened section is located between the lower section and the upper section. The minimum cross-sectional area may be located in the central third of the free length of the supporting members, preferably at half the free length. The free length of the supporting members is defined as the distance between the respective upper and lower surfaces where the ends of the supporting members join the lower and upper sections.

In operation, each supporting member is arranged to deform resiliently when the hood stop is subjected to an impact force up to a predetermined limit and to fracture or yield when said predetermined limit is exceeded.

According to one embodiment, the upper, lower and impact absorbing sections comprise an integral component. The integral component can be injection molded from a suitable plastic material. One example of a plastic material suitable for this purpose is polypropylene (PP).

According to one embodiment, the upper section is provided with an elastic member arranged to contact the lower surface of a closed hood during normal use. The elastic member may comprise a rubber or elastomer material with a central attachment means. The central attachment means may be attached in an opening through the upper section.

According to a further embodiment, the lower section may be provided with an opening into which at least the upper section can be moved. This serves to maximize the distance that the hood can be displaced during an impact. The opening may also be continued to pass through the surface, or vehicle chassis, onto which the hood stop is attached. In this way the upper section and the associated resilient member can be moved completely out of the way to maximize displacement distance.

The hood stop may comprise at least two impact absorbing sections, each arranged to deform at different magnitudes of impact force. In this way it is possible to provide a controlled deformation of the hood stop over a predetermined displacement distance. According to a first example, improved control may be provided by a second impact absorbing sections in the form of a flat spring element arranged in the spaces between adjacent supporting members of the hood stop. The flat spring means may comprise a number of spring legs equal to the number of supporting members. The flat spring element may have a central portion attached to the upper section and the spring legs arranged to extend intermediate the supporting members and to be supported against a cooperating surface or edge adjacent the lower section. Alternatively, the spring legs of the flat spring element may be arranged along each inner surface of the supporting members.

In another embodiment, the hood stop may comprise a coil spring attached to the upper or the lower section of the hood stop. The coil spring can be combined with any of the above examples.

In another embodiment, the hood stop may be provided with a second impact absorbing comprising at least one collapsible leg connected to the first portion and surrounded by the supporting members as it extends towards the lower section. The collapsible legs may be substantially straight or may diverge from one another and from a central axis as they extend towards the lower section. The collapsible legs are joined at an upper section which may comprise a ring shaped member to be attached to the upper section. According to a preferred example, the collapsible legs are shorter than the first impact absorbing section. Alternatively, the second impact absorbing section may comprise collapsible legs of different lengths.

In addition, each of the at least one impact absorbing sections may be replaceable and may also be re-combined to form hood stops having predetermined, desired impact absorbing properties. Hence, the characteristics of the hood stop can be adjusted by selecting one or more of the disclosed components or by varying the dimensions and/or characteristics of the individual components. The use of multiple impact absorbing sections results in a controlled deformation over the entire displacement distance of the hood stop. In this way the deformation force can be absorbed in several steps as each component comes into operation, which will lower the Head Injury Criteria (HIC) values for the pedestrian or cyclist striking the hood.

BRIEF DESCRIPTION OF THE DRAWINGS

The invention will be described in detail with reference to the attached figures. It is to be understood that the drawings are designed solely for the purpose of illustration and are not intended as a definition of the limits of the invention, for which reference should be made to the appended claims. It should be further understood that the drawings are not necessarily drawn to scale and that, unless otherwise indicated, they are merely intended to schematically illustrate the structures and procedures described herein.

DETAILED DESCRIPTION

Figure 1:
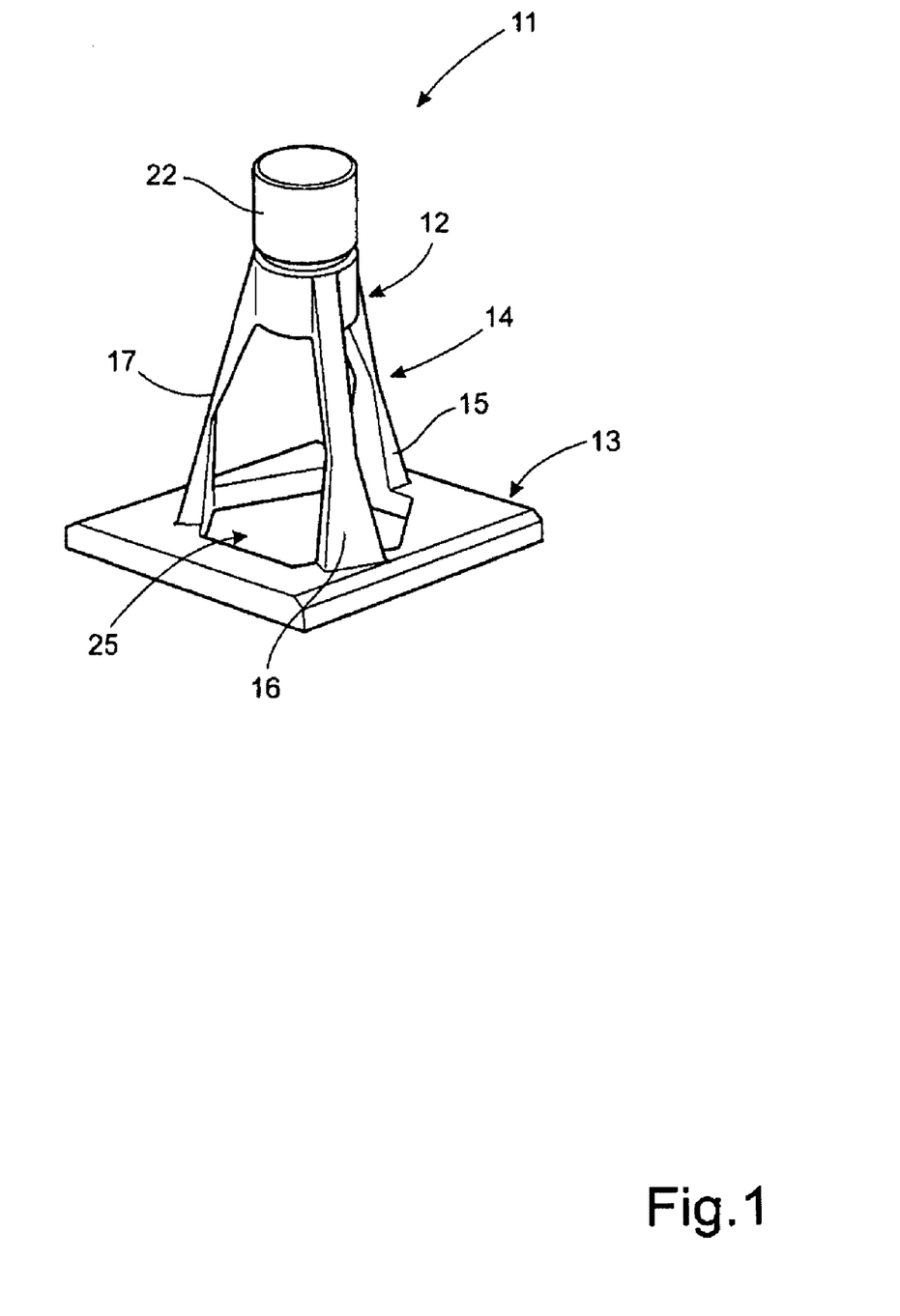
FIG. 1 shows a schematic illustration of a hood stop according to an embodiment of the invention.
Figure 2:
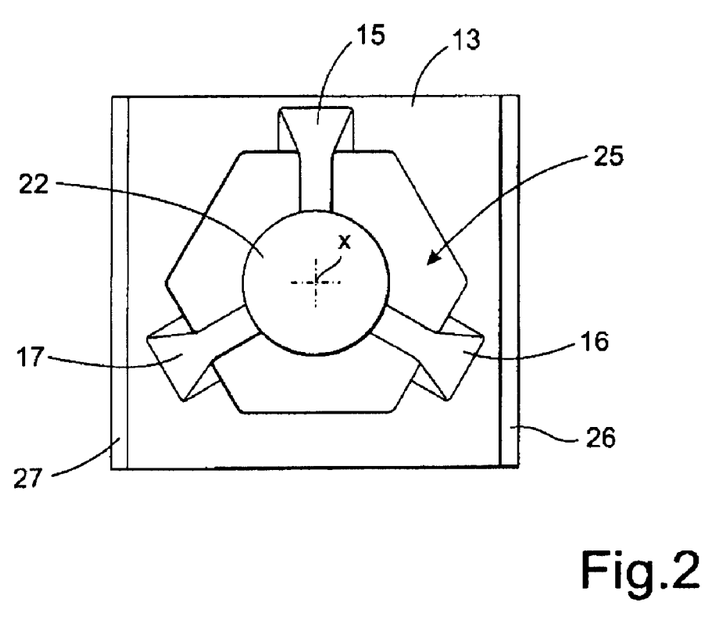
FIG. 2 shows a plan view of the hood stop in FIG. 1.

FIG. 1 shows a schematic illustration of a hood stop 11 having an upper section 12 adapted to be disposed below a lower surface of the hood (not shown) and a lower section 13 adapted to be attached to the body, frame or other portion or component of the vehicle that underlies the hood when the hood is closed. The hood stop 11 further includes an impact absorbing section 14 disposed between the upper and loser sections 12, 13 and comprising three collapsible supporting members 15, 16, 17 arranged to diverge from one another as they extend from the upper section 12 towards the lower section 13.

Figure 3:
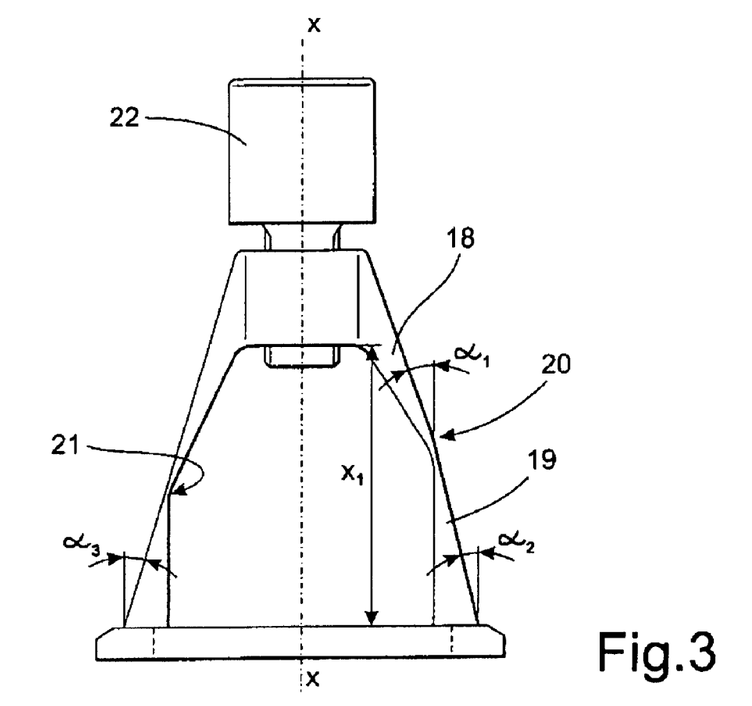
FIG. 3 shows a schematic illustration of a hood stop including two possible embodiments of a supporting member.

The supporting members 15, 16, 17 may be arranged with an equidistant spacing about a central axis X extending through the upper and lower sections 12, 13 of the hood stop 11. FIG. 3 shows a schematic illustration of a hood stop having two alternative embodiments of the supporting members. As shown on the right hand side of FIG. 3, each supporting member 15, 16, 17 comprises a first portion 18 arranged at a first acute $\alpha_1$ and a second portion 19 arranged at a second acute angle $\alpha_2$. Both angles are measured relative to the central axis X through the hood stop and are measured along the outer surfaces of the respective first and second portions. An outer surface is defined as a surface facing away from the central axis X of the hood stop 11, and an inner surface is defined as a surface facing toward the central axis X.

The first acute angle $\alpha_1$ may be greater than the second acute angle $\alpha_2$ as shown on the right hand side of FIG. 3. Alternatively, first acute angle $\alpha_1$ may be equal to the second acute angle $\alpha_2$, in which case the result is that both portions 18, 19 of the supporting members 15, 16, 17 are arranged at a constant third acute angle $\alpha_3$, as indicated in the left hand side of FIG. 3. This embodiment, using a constant angle $\alpha_3$, corresponds to the embodiment depicted in FIG. 1.

If the first acute angle $\alpha_1$ is greater than the second acute angle $\alpha_2$, then the intersection between the first and second portions provides a weakened section 20 that creates a transverse hinge 21 about which the supporting members 15, 16, 17 may be deformed. The supporting members may be spaced equally around the circumference about a central axis X through the upper and lower sections of the hood stop.

As is best seen in FIGS. 1 and 3, each supporting member 15, 16, 17 comprises a weakened section 20 having a cross-sectional area reduced with respect to the immediately adjacent portions of the member. The cross-sectional area of each supporting member may be progressively reduced towards the middle of each leg. The minimum cross-sectional area occurs at the weakened section 20 between the first and second portions 18, 19 and creates a transverse hinge 21 about which the supporting members 15, 16, 17 may be deformed. The force required to collapse the hood stop can be controlled by selecting a suitable minimum cross-sectional area and/or by selecting suitable angles $\alpha_1$, $\alpha_2$, $\alpha_3$.

The selection of suitable minimum cross-sectional area and/or suitable angles can also be used to control the direction of collapse of the hood stop. For instance, if one supporting member is provided with a smaller cross-sectional area than the remaining two supporting members, then a sufficiently large downward force on the hood stop will cause this weaker supporting member to deform and/or fracture before the remaining supporting members. Alternatively, one of the supporting members can be provided with a first and second portions having different angles $\alpha_1$, $\alpha_2$ as described above. In this way the hood stop can be made to collapse in a predetermined direction, for instance, towards a location where there is sufficient space to avoid interference between the collapsed hood stop and the displaced hood.

The minimum cross-sectional area of each weakened section is located at the juncture between the upper section 12 and the lower section 13. The minimum cross-sectional area may be located in the central third of the total free length $x_1$ of the supporting members 15, 16, 17, and more specifically at approximately half the free length x1 as shown in FIG. 3. The free length $x_1$ of the supporting members 15, 16, 17 is defined as the distance between the respective lower surface of the upper section 12 and the upper surface of the lower section 13, where the respective ends of the supporting members 15, 16, 17 join the lower and upper sections 12, 13.

In operation, each supporting member is arranged to deform resiliently away (outwardly) from the central axis X when the hood stop is subjected to an impact force up to a predetermined limit. When the predetermined limit is exceeded, the supporting members 15, 16, 17 will fracture or yield at or adjacent their respective weakened sections 20, 21.

Figure 4:
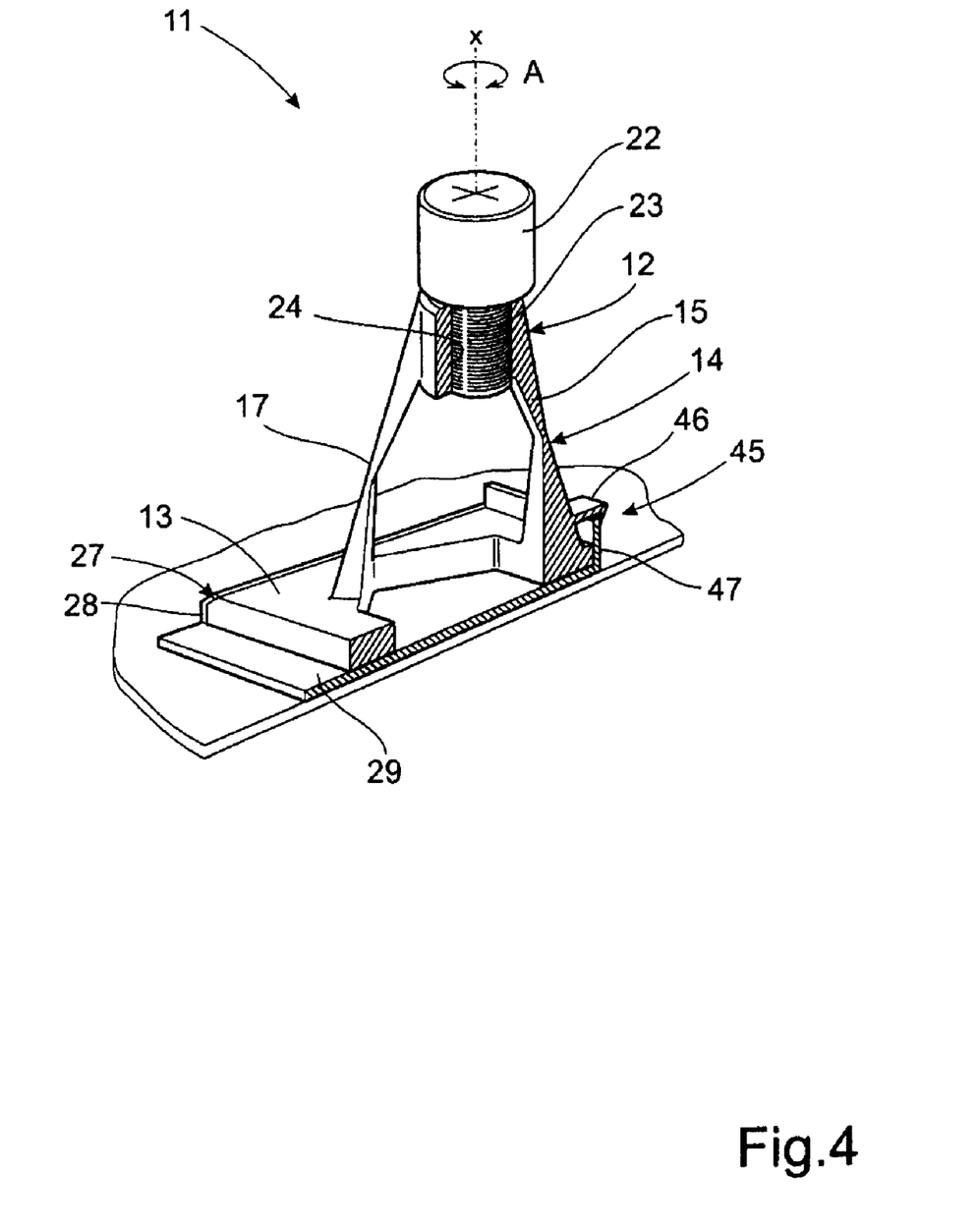
FIG. 4 shows a partial section through the hood stop of FIG. 1.

According to one disclosed embodiment of the invention, the upper, lower and impact absorbing sections 12, 13, 14 comprise an integral component as shown in FIGS. 1-4. The integral component can be injection molded from a suitable plastic material. An example of a plastic material that may be used for this purpose is polypropylene. The upper section 12 may be provided with an elastic member 22 arranged to contact the lower surface of a closed hood during normal use. In the example shown in FIG. 4, showing a partial cross-section through the hood stop of FIG. 1, the elastic member 22 comprises a rubber or other elastomeric material with a centrally located male threaded fastener 23. The threaded fastener 23 is attached in and rotatably adjustable (see arrow A) relative to a corresponding threaded opening 24 through the upper section. The threaded opening 24 has a pitch angle selected to make the thread self-locking. In this way the vertical position of the elastic member 22 can be adjusted to a suitable height for cooperation with the lower surface of the closed hood.

Figure 5:
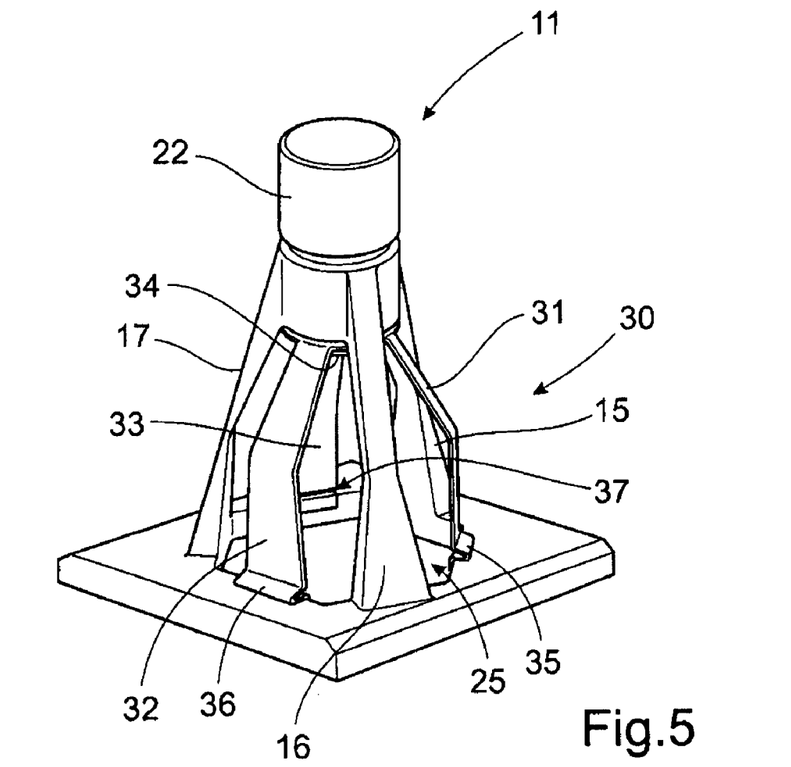
FIG. 5 shows a hood stop with a second impact absorbing section comprising a flat spring element.
Figure 6:
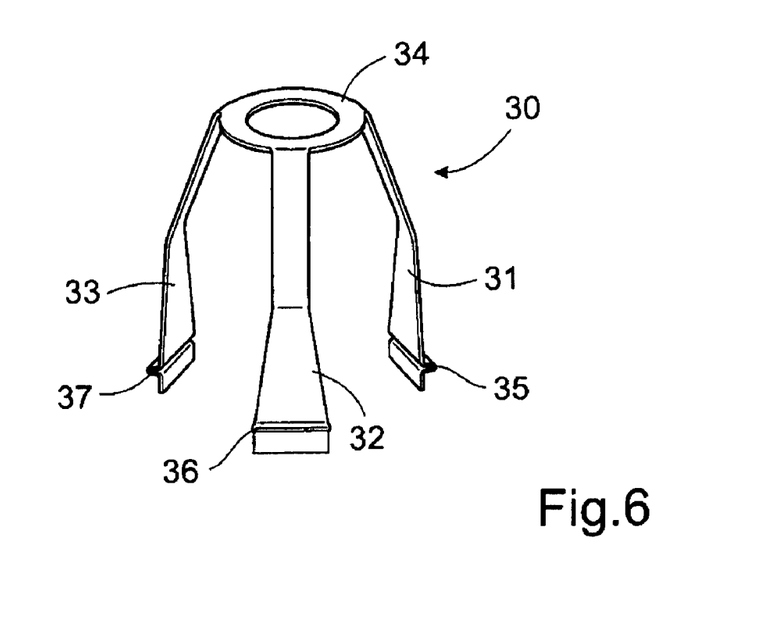
FIG. 6 shows an example of a second impact absorbing section used in the hood stop of FIG. 5.

The hood stop as described above may comprise two or more impact absorbing sections, each arranged to deform at different magnitudes of impact force. In this way it is possible to provide a controlled deformation of the hood stop over a predetermined displacement distance. FIG. 5 shows an example of a hood stop having upper, lower, and impact absorbing sections 12, 13, 14 substantially similar to that shown in FIG. 1 but additionally having a second impact absorbing section comprising a flat spring element 30. Flat spring element 30 is shown in isolation in FIG. 6. Improved deformation control is provided by the flat spring element 30 disposed between adjacent supporting members 15, 16, 17 of the hood stop 11. The flat spring element 30 has three spring legs 31, 32, 33 and a central portion 34 attached to the upper section 12. The spring legs 31, 32, 33 comprise flat springs arranged to extend between the upper and lower sections 12, 13 intermediate the supporting members 15, 16, 17. Each of the spring legs 31, 32, 33 of the flat spring element 30 is provided with a V-shaped projection 35, 36, 37 shaped by bending a lower portion of each leg. The V-shaped projections 35, 36, 37 are supported against a cooperating surface or edge adjacent the opening 25 of the lower section 13.

Figure 7:
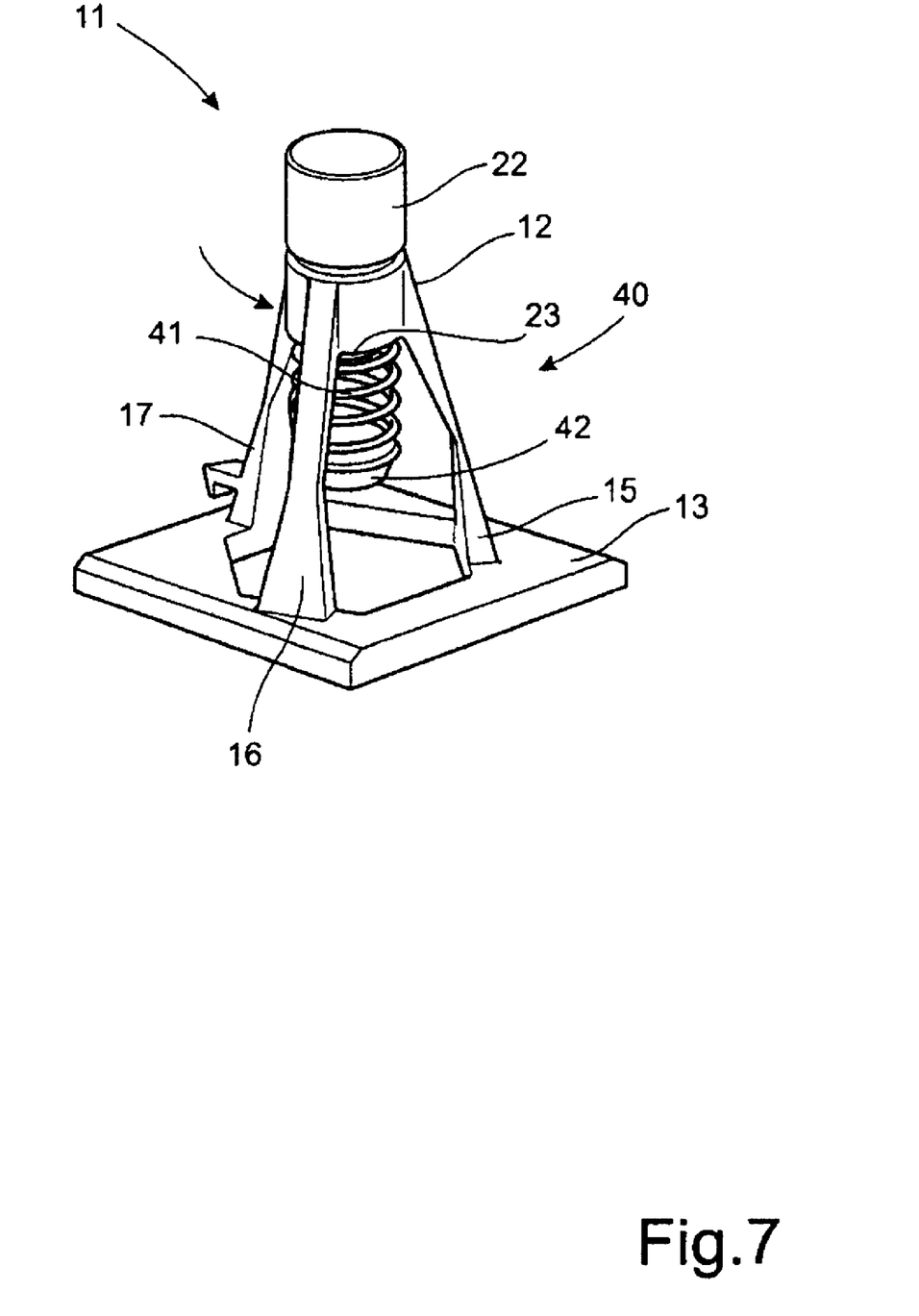
FIG. 7 shows a hood stop with a second impact absorbing section comprising a coil spring.

FIG. 7 shows a second example of a hood stop that is substantially similar to that shown in FIG. 1 but additionally provided with a second impact absorbing section 40 comprising a coil spring element 41. In the disclosed embodiment the upper end of the coil spring 41 is attached to the central, threaded fastener 23 of the elastic member 22 adjacent the lower surface of the upper section 12 of the hood stop 11. The lower end of the coil spring 41 is provided with an elastic member in the form of a rubber or elastomer stop 42. The elastomer stop 42 is provided to ensure that the coil spring 41 is properly supported by an underlying surface onto which the hood stop 11 is attached. The coil spring 41 described in this example can be used in combination with any one or both of the hood stop embodiments shown in FIG. 5 or 8.

Figure 8:
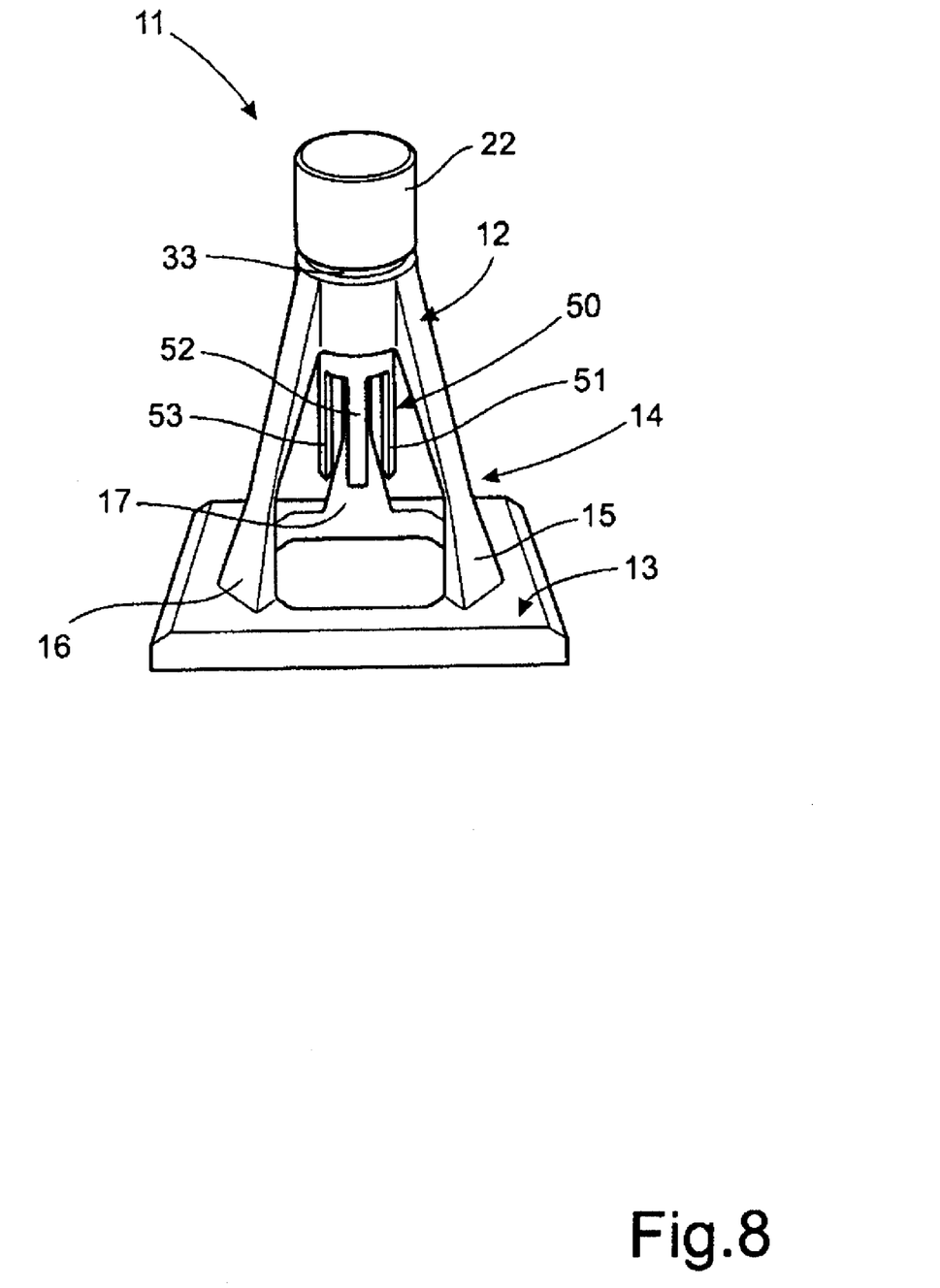
FIG. 8 shows a hood stop with a second impact absorbing section comprising multiple collapsible legs.

FIG. 8 shows a third embodiment of a hood stop that is substantially similar to that shown in FIG. 1 but additionally provided with a second impact absorbing section 50 having three substantially vertical collapsible legs 51, 52, 53. The second impact absorbing section 50 is disposed inside the first impact absorbing section 14 and may be attached to the threaded fastener 23 of the elastic member 22 adjacent the lower surface of the upper section 12. Collapsible legs 51, 52, 53 may be substantially straight or may diverge as they project from the upper towards the lower section. The number of collapsible legs 51, 52, 53 may be equal to the number of collapsible legs 15, 16, 17. According to a preferred example, collapsible legs 51, 52, 53 are shorter than the first impact absorbing section. In this way, the collapsible legs 51, 52, 53 will be loaded and begin to deform after the supporting members 15, 16, 17 have deformed or yielded.

The impact absorbing properties and the timing of the effect of the second impact absorbing section 50 can be varied by modifying the cross-sectional area and vertical length of the collapsible legs 51, 52, 53. It is also possible to add a third impact absorbing section (not shown) comprising a third set of collapsible legs with different dimensions and a longer or shorter length than the second legs 51, 52, 53. The second impact absorbing section 50 described in this example can be combined with any one or both of the examples shown in FIG. 5 or 7.

One or more of the impact absorbing sections may be replaceable and may also be re-combined to form hood stops having predetermined, desired impact absorbing properties. The impact absorbing characteristics of the hood stop can be adjusted by selecting one or more of the component and/or by varying the dimensions and/or characteristics of the individual components. The use of multiple impact absorbing sections allows a designer to achieve a controlled deformation over the entire displacement distance of the hood stop. The effect of this is indicated in FIG. 9, which shows a diagram plotting impact force F versus displacement distance D.

Figure 9:
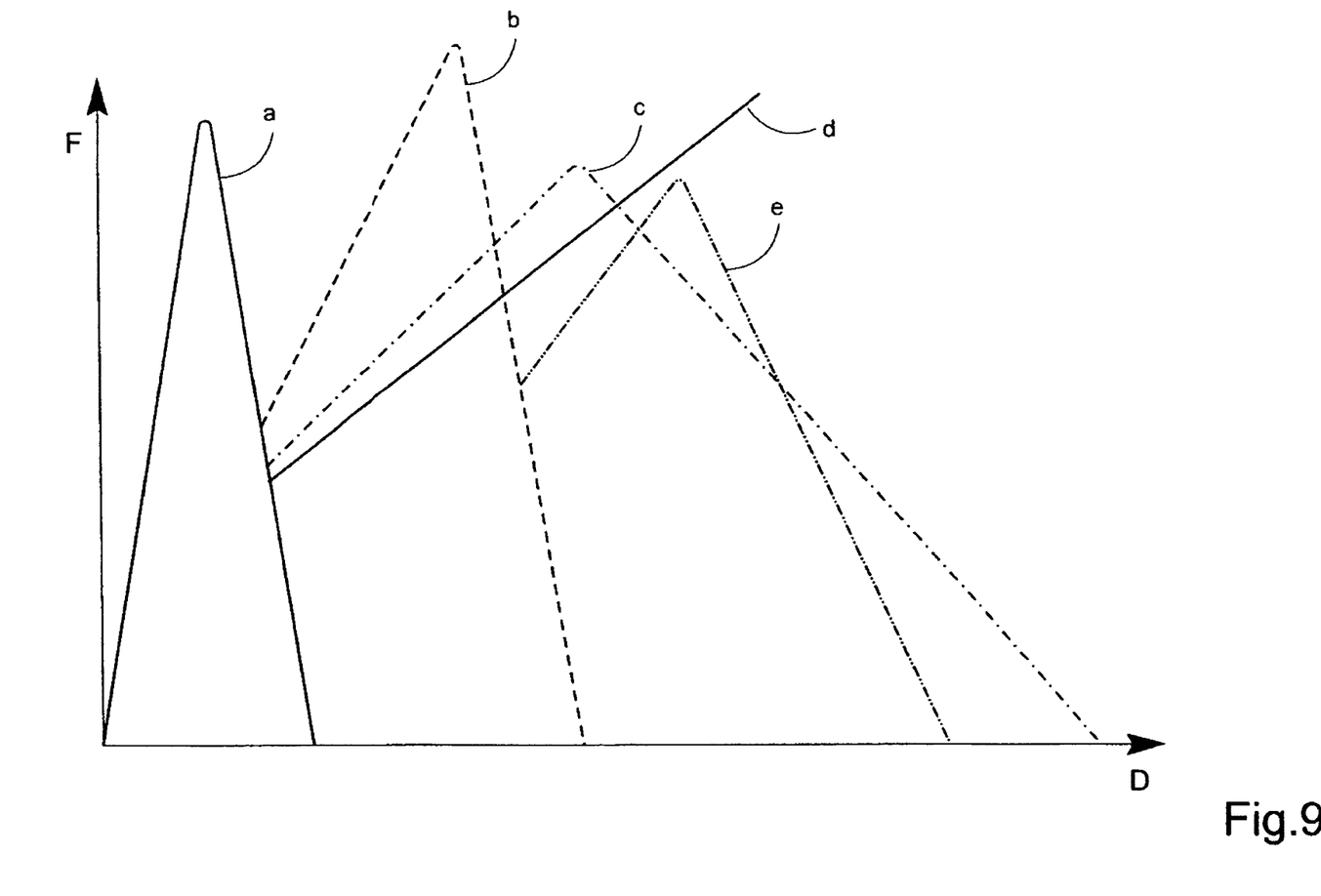
FIG. 9 shows a diagram plotting impact force over displaced distance for several embodiments of the hood stop.

In FIG. 9, a first curve notionally indicates the deformation characteristics of the hood stop shown in FIG. 1. A second curve b notionally indicates the deformation characteristics of the collapsible legs 51, 52, 53 of FIG. 8 combined with the hood stop shown in FIG. 1. A third curve c notionally indicates the deformation characteristics of the flat spring element 30 of FIG. 5 combined with the original hood stop shown in FIG. 1. A fourth curve d notionally indicates the deformation characteristics of the coil spring 41 of FIG. 7 combined with the original hood stop shown in FIG. 1. A fifth curve e notionally indicates the deformation characteristics of an assembly comprising a third impact absorbing section in addition to the collapsible legs 51, 52, 53 of FIG. 8 combined with the original hood stop shown in FIG. 1. The deformation characteristics of this combination will follow the combined curves a, b and e.

By combining the deformation characteristics of two or more of the components described above, impact forces can be absorbed in several steps as each component becomes activated. The components can be combined so that a subsequent component begins, or has already begun to take up impact forces when a previously activated component has reached its maximum capacity.

Alternatively, a subsequent component can support the absorption of impact forces in combination with a previously activated component. In this context, a component is considered to be activated when it begins to absorb impact forces. The combination of multiple components can be used to assemble a hood stop that is adapted for a particular hood and/or an available space between the hood and the underlying frame, chassis, or power train components. This allows for adaptation of a hood stop in order to lower the Head Injury Criteria (HIC) values for the pedestrian or cyclist striking the hood.

In order to maximize the distance that the hood can be displaced during an impact, the lower section 13 can be provided with an opening 25 into which at least the upper section can be moved. The opening 25 can also be continued (not shown) to pass through an attachment plate (see FIG. 4), or the vehicle component (frame, chassis, or power train, for example) onto which the hood stop 11 is attached. In this way the upper section 12 and any associated resilient members can be moved completely out of the way to maximize displacement distance.

Referring to FIG. 4, the lower section 13 comprises attachment means having a pair of first guide means 26, 27 (see FIG. 2) at opposite edges of the lower section 13. The first guide means 26, 27 are slidable relative to cooperating second guide means 28 (only one shown) on an attachment plate 29 on the vehicle. The second guide means 28 comprises facing guide means with an approximate L-shaped cross-section. This allows the entire hood stop 11 to be slid into place during mounting thereof. In order to fix the hood stop in position, the lower section 13 comprises a locking means 45 arranged to lock the lower section 13 in a predetermined position relative to the vehicle. In this example, the locking means 45 comprises a resilient tongue 46 with a beveled front surface and a substantially vertical locking surface. The resilient tongue 46 is an integral part of a front edge of a lower part of a supporting member 15. As the hood stop approaches its end position, the locking tongue 46 is deflected by an upright, substantially vertical fixed edge 47 of the attachment plate 29. The locking tongue 46 will then snap into place over a fixed edge 47 and retain the hood stop 11 in its correct end position. Depending on the height of the fixed edge, the resilient tongue can also be located on the lower section. The sliding direction of the hood stop should not coincide with a desired direction of collapse, as described above.

The exact dimensions of a hood stop may be determined by its location in relation to the hood and the available deformation distance between the underside of the hood and the chassis. As a rule, the available distance is less adjacent an outer edge of the hood and the assembly of components making up the hood is often relatively thin in this area. Similarly, the available distance is larger remote from the outer edge of the hood and the hood assembly is relatively thick. Hence, a hood stop located adjacent an outer edge of the hood will be subjected to impact forces immediately after impact, as the edge of the hood only has very limited impact absorbing properties. A hood stop located remote from the outer edge of the hood will be subjected to limited impact forces immediately after the impact. Depending on the impact absorbing properties of the hood assembly, the impact will first deform an impact zone in the hood assembly before acting on the hood stop. In both examples, it is desirable to provide a hood stop that will absorb the impact and if possible reduce the velocity of the impacting object to zero or near zero before it strikes the underlying chassis. Consequently, the length, width and thickness of the supporting members are selected depending on the position of the hood stop and the desired impact absorbing properties in this position.

The invention is not limited to the above examples, but may be varied freely within the scope of the appended claims.

What is claimed:

1. An impact absorbing hood stop for an automotive vehicle comprising:
   an upper section adapted to be disposed below a lower surface of a vehicle hood;
   a lower section adapted to be attached to a vehicle component underlying the hood; and
   a first impact absorbing section disposed between the upper section and the lower section and comprising at least three supporting members, each with a reduced cross-sectional area, diverging from one another and from a central axis extending through the upper and lower sections as they extend from the upper section toward the lower section, the reduced cross-sectional area of the first of the supporting members being different from the reduced cross-sectional areas of the remaining supporting members such that the first supporting member is weaker than and deforms before the remaining supporting members when the first impact absorbing section is subjected to an impact force.

2. The hood stop according to claim 1, wherein at least one of the supporting members comprises a first portion disposed at a first acute angle and a second portion disposed at a second acute angle, relative to a central axis through the upper and lower sections.

3. The hood stop according to claim 2, wherein the first acute angle is equal to or greater than the second acute angle.

4. The hood stop according to claim 1, wherein at least one of the supporting members is configured to deform resiliently when the hood stop is subjected to an impact force up to a predetermined limit and to yield when said predetermined limit is exceeded.

5. The hood stop according to claim 1, wherein the upper, lower and impact absorbing sections comprise an integral component.

6. The hood stop according to claim 1, wherein the upper section is provided with an elastic member configured to contact the lower surface of the hood during normal use.

7. The hood stop according to claim 1, wherein the hood stop further comprises at least one second impact absorbing section adapted to deform if subjected to an impact force exceeding a second predetermined limit different from the predetermined limit of the first impact absorbing section, in order to provide a controlled deformation over a predetermined displacement distance.

8. The hood stop according to claim 7, wherein a second impact absorbing section comprises a flat spring element disposed intermediate the supporting members, the flat spring element comprising a number of spring legs equal to the number of supporting members.

9. The hood stop according to claim 7, wherein the second impact absorbing section comprises a flat spring element disposed adjacent inner surfaces of the supporting members, the flat spring element comprising a number of spring legs equal to the number of supporting members.

10. The hood stop according to claim 7, wherein a second impact absorbing section comprises a coil spring disposed between the upper and the lower section of the hood stop.

11. The hood stop according to claim 7, wherein the second impact absorbing section comprises at least one collapsible leg connected to the first portion and surrounded by the supporting members as it extends towards the lower section.

12. The hood stop according to claim 11, wherein the second impact absorbing is shorter than the first impact absorbing section.

* * * * *